(12) United States Patent
Itagaki et al.

(10) Patent No.: US 7,576,617 B2
(45) Date of Patent: Aug. 18, 2009

(54) SEMICONDUCTOR INTEGRATED CIRCUIT DEVICE

(75) Inventors: Takatoshi Itagaki, Chitose (JP); Makio Abe, Chitose (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 86 days.

(21) Appl. No.: 11/705,705

(22) Filed: Feb. 13, 2007

(65) Prior Publication Data
US 2007/0205830 A1 Sep. 6, 2007

(30) Foreign Application Priority Data
Feb. 13, 2006 (JP) ............... 2006-035592
Jan. 22, 2007 (JP) ............... 2007-011479

(51) Int. Cl.
H03B 5/12 (2006.01)
(52) U.S. Cl. ............... 331/49; 331/2; 327/298
(58) Field of Classification Search ........... 331/49, 331/158, 145, 149; 713/1, 500, 502–503
See application file for complete search history.

(56) References Cited

U.S. PATENT DOCUMENTS 5,126,695 A * 6/1992 Abe ............... 331/46
5,982,241 A * 11/1999 Nguyen et al. ............... 331/49
2003/0014620 A1* 1/2003 Hanjani ............... 713/1
2005/0030113 A1* 2/2005 Ogawa et al. ............... 331/74
2005/0116780 A1* 6/2005 Endo et al. ............... 331/2

FOREIGN PATENT DOCUMENTS

JP      2001-174534     6/2001

OTHER PUBLICATIONS

Patent Abstract of Japan 2001-174534 Published Jun. 29, 2001.

* cited by examiner

*Primary Examiner*—James H. Cho
*Assistant Examiner*—Jany Tran
(74) *Attorney, Agent, or Firm*—Ladas and Parry LLP

(57) ABSTRACT

A semiconductor integrated circuit device is disclosed that includes a signal processing unit having a nonvolatile memory and a detection unit; plural oscillation sources outputting plural oscillation signals; a selection control unit that selects one of the oscillation signals output by the oscillation sources according to a selection signal, and controls a transfer timing for transferring circuit setting information from the nonvolatile memory to the detection unit and an operations start timing for starting signal processing operations of the signal processing unit according to the selected oscillation signal.

7 Claims, 6 Drawing Sheets

SEMICONDUCTOR INTEGRATED CIRCUIT DEVICE

BACKGROUND OF THE INVENTION

1. Field of the Invention

The present invention relates to a semiconductor integrated circuit device that has plural oscillation sources.

2. Description of the Related Art

The lithium ion battery may be installed in various portable devices such as the digital camera. It is generally difficult to detect the remaining power of the lithium ion battery based on its voltage, and therefore, the remaining power of the lithium ion battery is normally measured by integrating the battery charge/discharge currents (e.g., see Japanese Laid-Open Patent Publication No. 2001-174534).

It is noted that a signal processing device such as a fuel gauge IC that performs signal processing operations for measuring the remaining power of a battery is being developed. Such a fuel gauge IC includes a CPU and a memory and is configured to measure the remaining power of a battery by converting detected charge/discharge current measurements into digital data and integrating the data. The fuel gauge IC uses an oscillator circuit to measure time.

Generally, an internal oscillator circuit is installed in such a fuel gauge IC in order to reduce costs and minimize the substrate mounting area. However, an oscillator circuit having an external crystal oscillating element is preferably used instead of an internal oscillator circuit in order to measure time more accurately and to thereby measure the remaining battery power more accurately. In this respect, the fuel gauge IC is preferably adapted for implementation of both the internal oscillator circuit and the crystal oscillator circuit.

Referring to FIG. 7 that illustrates oscillation signals output by the internal oscillator circuit and the crystal oscillator circuit, the internal oscillator circuit may start oscillation immediately after power is turned on at time t30 as is shown in FIG. 7 (B); on the other hand, the crystal oscillator circuit requires a time period of around 10 msec for stabilizing the oscillation waveform as is shown in FIG. 7 (C). Also, it is noted that an IC chip of a signal processing device may be reset during the time a power-on reset signal is set to high level as is shown in FIG. 7 (A).

Also, in the signal processing device as is described above, information such as trimming information stored in the memory has to be read and transferred to an analog circuit or a power supply circuit before the CPU is released from reset mode. In this respect, information is transferred from the memory to relevant circuits before reset operations of the IC chip is completed. In this case, a processing time of approximately 10 μsec may be required for transferring the information, for example.

It is noted that since the time required for stabilizing the oscillation of the internal oscillator circuit and the crystal oscillator circuit is different, the transfer timing for transferring information such as trimming information to relevant circuits and the release timing for releasing the CPU from reset mode may be different for each oscillator circuit. Therefore, activation sequences may vary depending on the oscillator circuit being used so that separate chips may have to be fabricated for the different oscillator circuits. When separate chips are fabricated to enable use of different oscillator circuits, manufacturing costs may be increased, for example.

SUMMARY OF THE INVENTION

According to an aspect of the present invention, a technique is provided for enabling a semiconductor integrated circuit device to activate a signal processing unit in a desirable manner in accordance with an oscillation source being selected for use.

According to an embodiment of the present invention, a semiconductor integrated circuit device is provided that includes:

a signal processing unit including a nonvolatile memory and a detection unit;

plural oscillation sources outputting plural oscillation signals;

a selection control unit that selects one of the oscillation signals output by the oscillation sources according to a selection signal, and controls a transfer timing for transferring circuit setting information from the nonvolatile memory to the detection unit and an operations start timing for starting signal processing operations of the signal processing unit according to the selected oscillation signal.

In a preferred embodiment, the semiconductor integrated circuit device may further include:

a power-on reset unit that detects a power-on status and resets the signal processing unit; wherein the selection control unit may determine the transfer timing and the operations start timing based on a reset timing of the power-on reset unit.

In another preferred embodiment, the oscillation sources may include a first oscillation output unit that is integrated into a semiconductor integrated circuit and a second oscillation output unit that uses an external crystal oscillating element.

In another preferred embodiment, the selection control unit may include a selection unit that selects one of a first oscillation signal output by the first oscillation output unit or a second oscillation signal output by the second oscillation output unit according to the selection signal;

a first counter that inputs the selected one of the first oscillation signal or the second oscillation signal and counts to a first time period that is required for transferring the circuit setting information;

a second counter that inputs the selected one of the first oscillation signal or the second oscillation signal and counts to a second time period that is required for stabilizing the second oscillation signal; and a third counter that inputs the selected one of the first oscillation signal or the second oscillation signal and counts to a third time that is obtained by subtracting the first time period from the second time period; wherein when the first oscillation signal is selected, the selection control unit controls the transferring of the circuit setting information to start when the power-on reset unit resets the signal processing unit, and controls the signal processing operations of the signal processing unit to start after the first time period elapses from the transfer start timing; and when the second oscillation signal is selected, the selection control unit controls the transferring of the circuit setting information to start after the third time period elapses from the time the power-on reset unit resets the signal processing unit, and controls the signal processing operations of the signal processing unit to start after the second time period elapses from the time the power-on reset unit resets the signal processing unit.

In another preferred embodiment, the selection signal may be supplied from an external source.

In another preferred embodiment, the signal processing unit may include a register that stores the selection signal.

DETAILED DESCRIPTION OF THE PREFERRED EMBODIMENTS

In the following, preferred embodiments of the present invention are described with reference to the accompanying drawings.

[Configuration]

Figure 1:
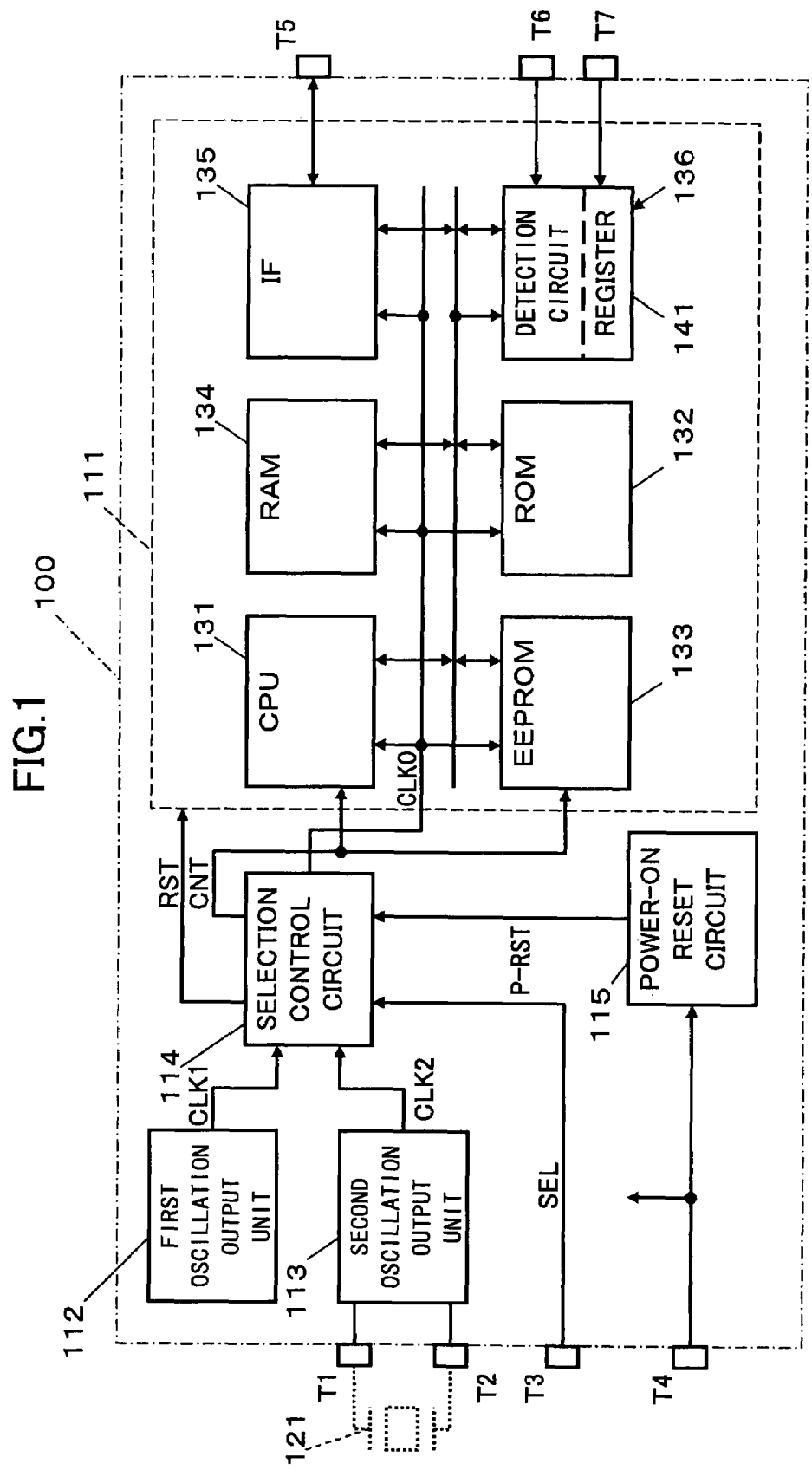
FIG. 1 is a circuit diagram of a signal processing circuit device according to an embodiment of the present invention.

FIG. 1 is a circuit diagram of a signal processing circuit device according to an embodiment of the present invention.

The illustrated signal processing circuit device 100 according to the present embodiment may be a fuel gauge IC, for example, corresponding to a one-chip semiconductor integrated circuit. The signal processing circuit device 100 includes a processing circuit 111, a first oscillation output unit 112, a second oscillation output unit 113, a selection control circuit 114, and a power-on reset circuit 115.

The processing circuit 111 as an embodiment of a signal processing unit includes a CPU 131, a ROM 132, an EEPROM 133, a RAM 134, an interface circuit 135, and a detection circuit 136. The CPU 131 acquires a current value from the detection circuit 136 based on a program stored in the ROM 132, calculates the remaining battery power based on the current value acquired from the detection circuit 136, and outputs the calculated value to the exterior via the interface circuit 135.

The EEPROM 133 is a rewritable nonvolatile memory that stores circuit setting information such as trimming information for adjusting the resistance and capacitance of the detection circuit 136 corresponding to an analog circuit. The trimming information stored in the EEPROM 133 is transferred to a register 141 when the processing circuit 111 is activated.

The detection circuit 136 as an embodiment of a detection unit is connected to terminals T6 and T7. The voltage across a resistor that passes on battery charge/discharge currents may be applied to the terminals T6 and T7, for example. The detection circuit 136 performs differential amplification of the voltage of the terminals T6 and T7, converts the amplified value into a current value and then to a digital value, and supplies the digital value to the CPU 131. The detection circuit 136 includes the register 141 that stores the trimming information for adjusting its resistance and capacitance.

The detection circuit 136 turns on/off a switch based on the trimming information stored in the register 141 so that a resistance and capacitance for trimming may be bypassed or connected to perform fine adjustment of the internal resistance and capacitance of the detection circuit 136. The trimming information may be determined so that the internal resistance, capacitance, and reference voltage of the detection circuit 136 take optimal values at the time of chip inspection, for example. The trimming information determined in this manner is stored in the EEPROM 133 to be transferred to the register 141 upon activation.

It is noted that in certain embodiments, a resistor for storing trimming information may be provided in the first oscillation output unit 112. The trimming information for the first oscillation output unit 112 may be determined so that the internal resistance and capacitance of the first oscillation output unit 112 may take optimal values for setting the oscillation frequency of the first oscillation output unit 112 at its prescribed value at the time of chip inspection, for example. The trimming information determined in this manner may be stored in the EEPROM 133 to be transferred to the corresponding resistor upon activation.

The RAM 134 is used as a working memory area for the CPU 131. The interface circuit 135 is used to exchange information with an external source.

The processing circuit 111 operates based on an oscillation signal from the selection control circuit 114, detects charge/discharge currents of a battery based on the voltage applied to the terminals T6 and T7, detects the remaining power of the battery by integrating the detected charge/discharge currents, and outputs the detected remaining battery power information to the exterior via terminal T5 using the interface circuit 135.

The first oscillation output unit 112 is an internal oscillator circuit that is integrated into a semiconductor integrated circuit. For example, the first oscillation output unit 112 may be an oscillator having a PLL that generates a first oscillation signal CLK1 of several MHz. The first oscillation signal CLK1 generated at the first oscillation output unit 112 rises substantially at the same time the power is turned on. The first oscillation signal CLK1 output from the first oscillation output unit 112 is supplied to the selection control circuit 114.

The second oscillation output unit 113 uses a crystal oscillating element that is connected to terminals T1 and T2 to generate a second oscillation signal CLK2 of several MHz. It is noted that the second oscillation signal CLK2 may be more accurate than the first oscillation signal CLK1 since it is generated by the crystal oscillating element. The second oscillation signal CLK1 that is output from the second oscillation output unit 113 is supplied to the selection control circuit 114.

The selection control circuit 114 receives a selection signal SEL from terminal T3 and a power-on reset signal P-RST from the power-on reset circuit 115. The selection control circuit 114 selects one of either the first oscillation signal CLK1 or the second oscillation signal CLK2 output from the first oscillation output unit 112 or the second oscillation output unit 113 according to the selection signal SEL, supplies the selected oscillation signal to the processing circuit 111, and controls the activation timing of the processing circuit 111 according to the selected oscillation signal.

A power supply voltage from terminal T4 is applied to the power-on reset circuit 115. The power-on reset circuit 115 detects the rise of the power supply voltage supplied to terminal T4 and generates a power-on reset signal P-RST.

Figure 2:
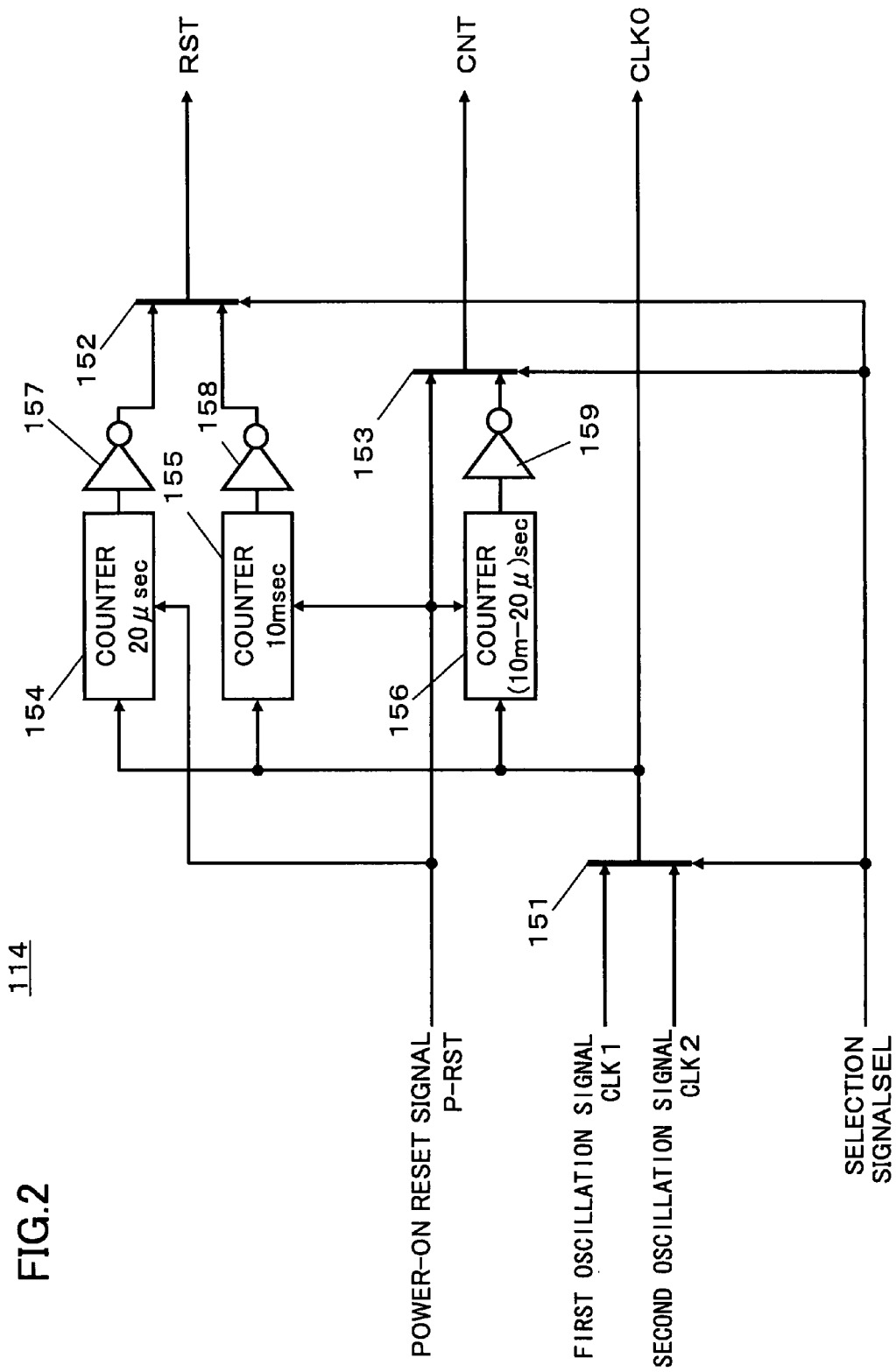
FIG. 2 is a circuit diagram of a selection control circuit of the signal processing circuit device shown in FIG. 1.

FIG. 2 is a circuit diagram of the selection control circuit 114.

The selection control circuit 114 includes selectors 151-153, counters 154-156, and invertors 157-159.

The first oscillation signal CLK1 from the first oscillation output unit 112 and the second oscillation signal CLK2 from the second oscillation output unit 113 are supplied to the selector 151. The selector 151 selects and outputs the first oscillation signal CLK1 or the second oscillation signal CLK2 according to the selection signal SEL supplied to terminal T3 from an external source (e.g., the first oscillation signal CLK1 may be selected when the selection signal SEL is at low level and the second oscillation signal CKL2 may be selected when the selection signal SEL is at high level). The oscillation signal selected by the selector 151 is supplied to the processing circuit 111 as a drive clock CLK0 for the processing circuit 111 and the counters 154-156.

The oscillation signal selected by the selector 151 and the power-on reset signal P-RST generated at the power-on reset circuit 115 are supplied to the counter 154. The counter 154 detects the fall edge of the power-on reset signal P-RST, and starts counting the oscillation signal selected by the selector 151.

After counting to α μsec (e.g., where α is a value in the order of several dozen) from the time of detection of the fall edge of the power-on reset signal P-RST, the counter 154 switches its output from low level to high level. After switching its output to high level, the counter 154 maintains its output at high level until the power is turned off, for example. It is noted that the count time of the counter 154 is not limited to α μsec and may be set to any time period that is adequate for enabling transfer of trimming information from the EEPROM 133 to the register 141. The output of the counter 154 is supplied to the selector 152 via the inverter 157.

The oscillation signal selected by the selector 151 and the power-on reset signal P-RST generated at the power-on reset circuit 115 are supplied to the counter 155. The counter 155 detects the fall edge of the power-on reset signal P-RST, and starts counting the oscillation signal selected by the selector 151. After counting to β msec (e.g., where β is a value in the order of 10) from the time of detection of the fall edge of the power-on reset signal P-RST, the counter 155 switches its output from low level to high level. Alternatively, the counter 155 may switch its output from high level to low level. After switching its output, the counter 155 may maintain its output signal level until the power is turned off, for example.

It is noted that the count time of the counter 155 is not limited to β msec and may be set to any time period that is adequate for stabilizing the second oscillation signal CLK2 so that operations of the CPU 131 may be stabilized. The output of the counter 155 is supplied to the selector 152 via the inverter 158.

The oscillation signal selected by the selector 151 and the power-on reset signal P-RST generated at the power-on reset circuit 115 are supplied to the counter 156. The counter 156 detects the fall of the power-on reset signal P-RST from high level to low level, and starts counting the oscillation signal selected by the selector 151.

After counting to [β msec-α μsec] from the time of detection of the fall edge of the power-on reset signal P-RST, the counter 156 switches its output from low level to high level. Alternatively, the counter 156 may switch its output from high level to low level. After switching its output, the counter 156 may maintain its signal output level until the power is turned off, for example.

It is noted that the count time of the counter 156 is not limited to [β msec-α μsec] and may be set to any time period obtained by subtracting the time required for enabling transfer of trimming information from the EEPROM 133 to the register 141 from the adequate time for stabilizing operations of the CPU 131 by the second oscillation signal CLK2. The output of the counter 156 is supplied to the selector 153 via the inverter 159.

The selector 152 selects and outputs the output of the counter 154 or the output of the counter 155 according to the selection signal SEL supplied to the terminal T3 from an external source (e.g., the output of the counter 154 may be selected when the selection signal SEL is at low level and the output of the counter 155 may be selected when the selection signal SEL is at high level). The output of the selector 152 is supplied to the processing circuit 111 as a reset signal RST for resetting the processing circuit 111.

The processing circuit 111 may be in reset mode when the reset signal RST is at high level and in reset release mode when the reset signal RST is at low level.

The selector 153 selects and outputs the power-on reset signal P-RST or the output of the counter 156 according to the selection signal SEL (e.g., the power-on reset signal P-RST may be selected when the selection signal SEL is at low level and the output of the counter 156 may be selected when the selection signal SEL is at high level). The output of the selector 153 is supplied to the EEPROM 133 and the register 141 as a control signal CNT for starting transfer of the trimming information from the EEPROM 133 to the register 141 of the processing circuit 111.

When the control signal CNT is set to low level, a built-in transfer circuit of the EEPROM 133 may be operated to transfer the trimming information stored in the EEPROM 133, for example, and the register 141 may receive the trimming information from the EEPROM 133 to store the received trimming information. In the present example, the transfer of the trimming information from the EEPROM 133 to the register 141 is completed within α μsec.

Once the trimming information is registered in the register 141, the CPU 131 may be able to execute desired processes based on programs installed in the ROM 132.

[Operations]

[Operations by First Oscillation Signal CLK1]

In the case of operating the processing circuit 111 with the first oscillation signal CLK1, the selection signal SEL is set to low level. When the selection signal SEL is set to low level, the selector 151 selects and outputs the first oscillation signal CLK1, the selector 152 selects and outputs the output of the counter 154, and the selector 153 selects and outputs the power-on reset signal P-RST.

Figure 3:
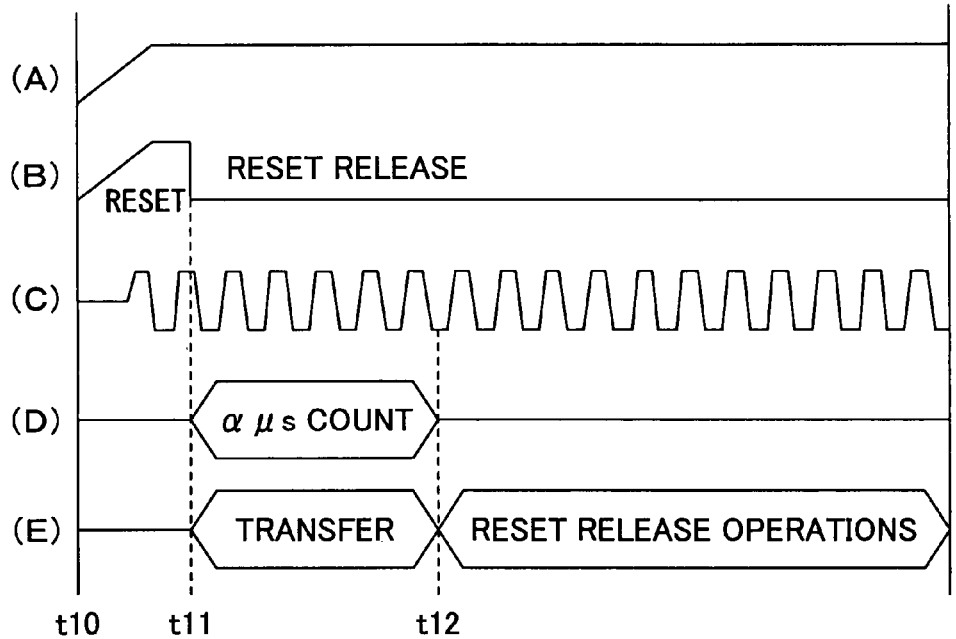
FIG. 3 is a diagram illustrating operations when a first oscillation signal is selected.

FIG. 3 is a diagram illustrating operations when the first oscillation signal CLK1 is selected according to an embodiment of the present invention. It is noted that in FIG. 3, (A) illustrates the power supply, (B) illustrates the power-on reset signal P-RST, (C) illustrates the first oscillation signal CLK1, (D) illustrates operations of the counter 154, and (E) illustrates operations of the processing circuit 111.

In the case of selecting the first oscillation signal CLK1, the selector 151 selects and outputs the first oscillation signal CLK1, the selector 152 selects and outputs the output of the inverter 157, and the selector 153 selects and outputs the power-on reset signal P-RST.

When the power supply is turned on at time t10, the first oscillation output unit 112 is activated so that the first oscillation signal CLK1 is output. The output first oscillation signal CLK1 is supplied to the processing circuit 111 via the selector 151 and to the counters 154-156.

At this point, the power-on reset signal P-RST is at high level, and the counters 154-156 are not counting the first oscillation signal CLK1. Accordingly, the outputs of the counters 154-156 are at low level. Since the output of the counter 154 is at low level, the output of the inverter 157 is at high level. Since the output of the inverter 157 is selected by the selector 152, the reset signal RST supplied to the processing circuit 111 is at high level. Thus, the processing circuit 111 is in reset mode.

Then, at time t11, the power supply voltage stabilizes, and the power-on reset signal P-RST falls from high level to low level. In turn, the control signal CNT corresponding to the output of the selector 153 selectively outputting the power-on reset signal P-RST falls from high level to low level. When the control signal CNT falls to low level, the EEPROM 133 and the register 141 are activated, and transfer of the trimming information from the EEPROM 133 to the register 141 is started as is shown in FIG. 3 (E).

At time t12, after $\alpha$ µsec elapses from the time the counter 154 starts counting the first oscillation signal CLK1, the output of the counter 154 rises from low level to high level. When the output of the counter 154 is switched to high level, the output of the selector 152 is switched to low level. When the output of the selector 152 is switched to low level, the processing circuit 111 is switched to reset release mode so that the processing circuit 111 may be able to perform processes based on installed programs. Since the transfer of the trimming information from the EEPROM 133 to the register 141 is completed within $\alpha$ µsec in the present example, the transfer is completed before time t12. Accordingly, the processing circuit 111 may execute processes according to the trimming information stored in the EEPROM 133.

As can be appreciated from the above descriptions, the processing circuit 111 may start execution of processes in a relatively short period of time by using the first oscillation signal CLK1 corresponding to an internal oscillating signal. That is, since the first oscillation signal is generated by an internal oscillator circuit, the first oscillation signal CLK1 may be stably output in response to the rise of the power supply. However, it is noted that accuracy of the first oscillation signal CLK1 may be lower than that of the second oscillation signal CLK2 that is generated by crystal oscillation.

[Operations by Second Oscillation Signal CLK2]

Figure 4:
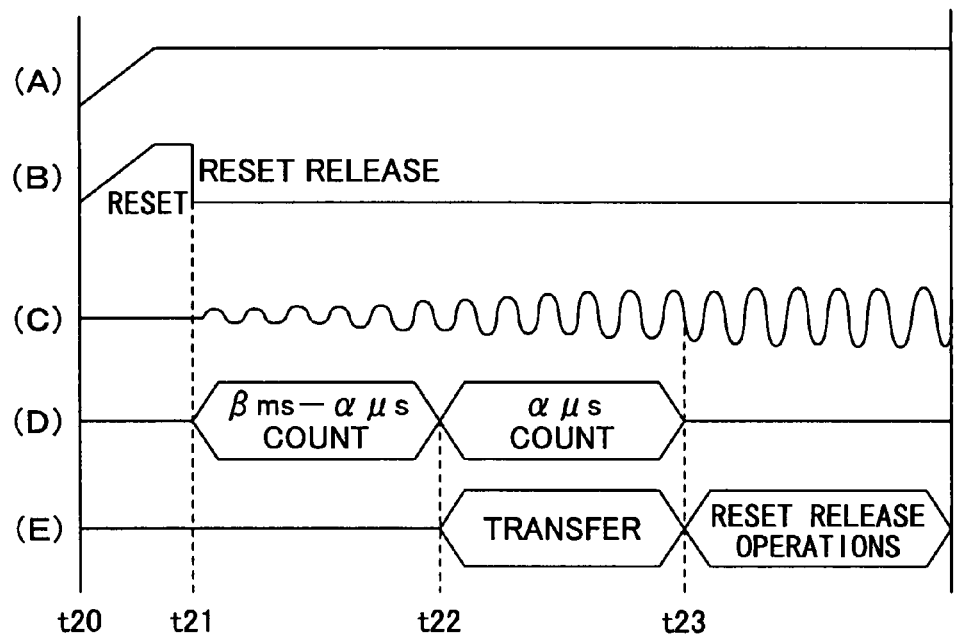
FIG. 4 is a diagram illustrating operations when a second oscillation signal is selected.

FIG. 4 is a diagram illustrating operations when the second oscillation signal CLK2 is selected according to an embodiment of the present invention. It is noted that in FIG. 4, (A) illustrates the power supply, (B) illustrates the power-on reset signal P-RST, (C) illustrates the second oscillation signal CLK2, (D) illustrates the reset signal RST/control signal CNT, and (E) illustrates operations of the processing circuit 111.

In the case of selecting the second oscillation signal CLK2, the selection signal SEL is set to high level. When the selection signal SEL is set to high level, the selector 151 selects and outputs the second oscillation signal CLK2, the selector 152 selects and outputs the output of the inverter 158, and the selector 153 selects and outputs the output of the inverter 159.

When the power supply is turned on at time t20, the second oscillation output unit 113 is activated, and the second oscillation signal CLK2 is output. The output second oscillation signal CLK2 is supplied to the processing circuit 111 via the selector 151 and to the counters 154-156.

At this point, the power-on reset signal P-RST is at high level and the counters 155 and 156 are not counting the second oscillation signal CKL2. Accordingly, the outputs of the counters 155 and 156 are at low level. Since the output of the counter 155 is at low level, the output of the inverter 158 is at high level. Since the output of the inverter 158 is selected by the selector 152, the reset signal RST supplied to the processing circuit 111 is at high level. Thus, the processing circuit 111 is set to reset mode.

Then, at time t21, the power supply voltage stabilizes and the power-on reset signal P-RST falls from high level to low level. In turn, the counters 155 and 156 start counting the second oscillation signal CLK2. At time t22, after a time period of [$\beta$ msec-$\alpha$ µsec] elapses from the time the counter 156 starts counting the second oscillation signal CLK2, the output of the counter 156 is switched to high level. When the output of the counter 156 is set to high level, the output of the inverter 159 is set to low level.

When the output of the inverter 159 is set to low level, the output of the selector 153 that corresponds to the control signal CNT falls from high level to low level. When the control signal CNT is set to low level, the EEPROM 133 and the register 141 are activated so that transfer of trimming information from the EEPROM 133 to the register 141 is started as is shown in FIG. 4 (E).

At time t23, after $\beta$ msec elapses from the time the counter starts counting the second oscillation signal CKL2, the output of the counter 155 is switched to high level. When the output of the counter 155 is set to high level, the output of the selector 152 is set to low level. When the output of the selector 152 is set to low level, the processing circuit 111 is switched to reset release mode so that the processing circuit 111 may be able to execute processes based on installed programs.

It is noted that since the transfer of the trimming information from the EEPROM 133 to the register 141 is completed within $\alpha$ µsec in the present example, the transfer may be completed before time t23. Accordingly, the processing circuit 111 may execute processes according to the trimming information stored in the EEPROM 133 after time t23.

As can be appreciated from the above descriptions, in the present example, the processing circuit 111 may start execution of processes after the second oscillation signal CLK2 generated by crystal oscillation stabilizes. It is noted that although a relatively long period of $\beta$ msec is required for the second oscillation signal CLK2 to stabilize, the second oscillation signal CLK2 may be more accurate than the first oscillation signal CLK1 so that the processing circuit 111 may be stably operated.

According to an embodiment of the present invention, an oscillation signal to be used may be selected from the first oscillation signal CLK1 or the second oscillation signal CLK2, and timings for transferring trimming information from the EEPROM 133 to the register 141 and releasing reset of the processing circuit 111 may be controlled according to the selected oscillation signal so that the processing circuit 111 may be promptly activated upon power on, for example.

The signal processing circuit device 100 according to an embodiment of the present invention is adapted to use the first oscillation signal CLK1 and the second oscillation signal CLK2 and selects one of the oscillation signals based on the selection signal SEL depending its intended usage, for example.

[Miscellaneous]

It is noted that in the above-described embodiment, one oscillation signal is selected from the first oscillation signal CLK1 or the second oscillation signal CLK2, and the timings for transferring trimming information from the EEPROM 133 to the resistor 141 and releasing reset of the processing circuit 111 are controlled according to the selected oscillation signal. However, the present invention is not limited to such an embodiment, and for example, the oscillation signal to be used may be selected from three or more different types of oscillation signals.

Also, although the selection signal SEL is supplied from an external source in the above-described embodiment, the present invention is not limited to such an embodiment, and for example, an internal register may be provided so that the selection signal may be internally generated and an external terminal for inputting the selection signal SEL may be omitted.

[Battery Pack]

Figure 5:
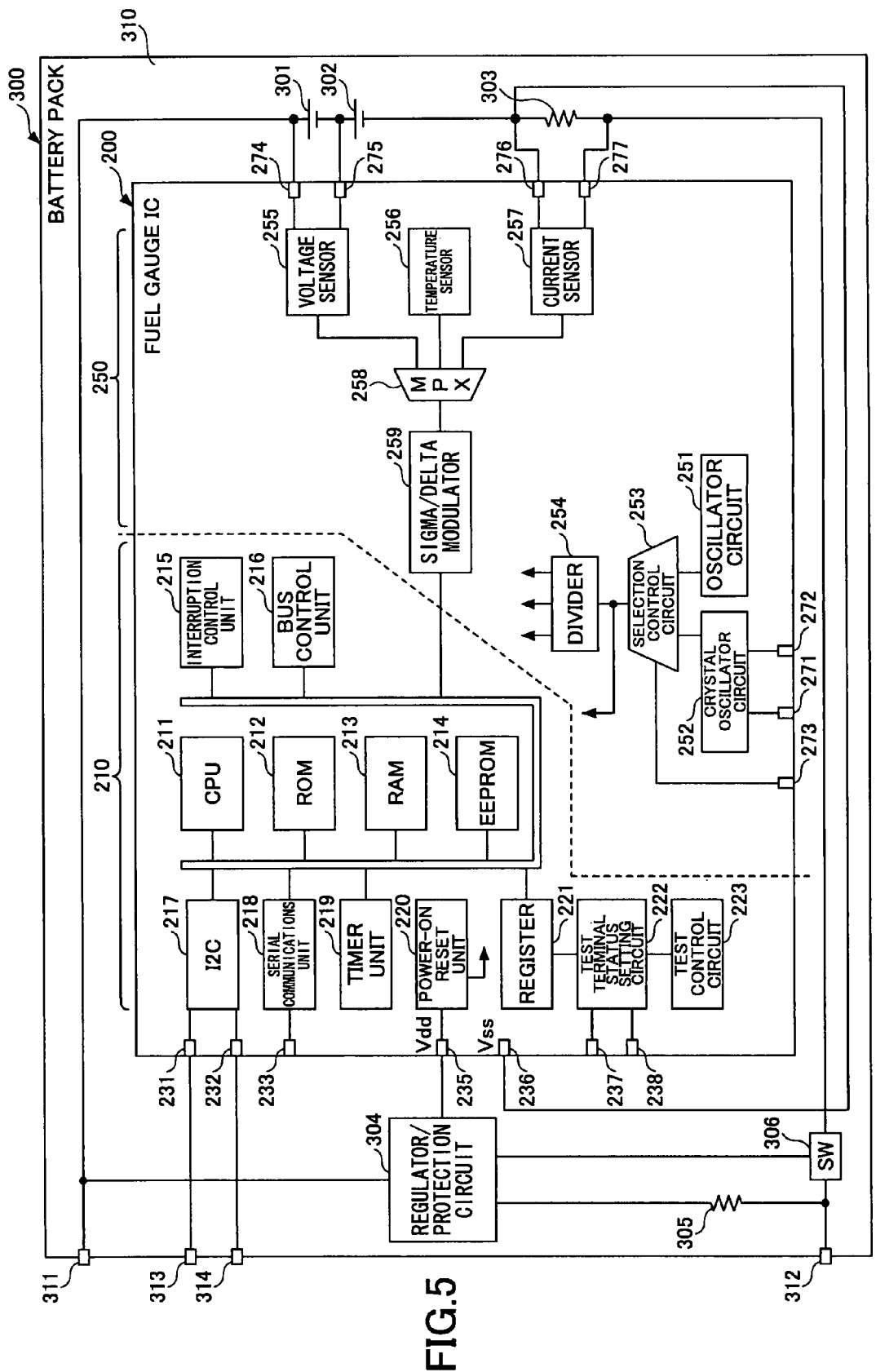
FIG. 5 is a circuit diagram of a battery pack that uses a signal processing circuit device according to an embodiment of the present invention.

FIG. 5 is a circuit diagram of a battery pack according to an embodiment of the present invention. The illustrated battery pack 300 includes a fuel gauge IC 200 corresponding to a semiconductor integrated circuit device that is made up of a digital unit 210 and an analog unit 250.

The digital unit 210 includes a CPU 212, a ROM 212, a RAM 213, an EEPROM 214, an interruption control unit 215, a bus control unit 216, an I2C unit 217, a serial communications unit 218, a timer unit 219, a power-on reset unit 220, a register 221, a test terminal status setting circuit 222, and a test control circuit 223. The CPU 211, the ROM 212, the RAM 213, the EEPROM 214, the interruption control unit 215, the bus control unit 216, the I2C unit 217, the serial communications unit 218, the timer unit 219, and the register 221 are interconnected by an internal bus.

It is noted that the CPU 211 may correspond to the CPU 131 of FIG. 1, the ROM 212 may correspond to the ROM 132 of FIG. 1, the RAM 213 may correspond to the RAM 134 of FIG. 1, the EEPROM 214 may correspond to the EEPROM 133 of FIG. 1, the I2C unit 217 may correspond to the interface circuit 135 of FIG. 1, and the power-on reset unit 220 may correspond to the power-on reset circuit 115 of FIG. 1.

The CPU 211 performs overall control of the fuel gauge IC 200 by executing programs stored in the ROM 212 to perform processes such as calculating the remaining battery power through integration of the battery charge/discharge currents. In this case, the RAM 213 is used as a working memory area for the CPU 211. The EEPROM 214 stores information such as trimming information.

The interruption control unit 215 receives interruption request signals from circuit units of the fuel gauge IC 200, generates interruption signals according to priority information assigned to the interruption request signals, and transmits the generated interruption signals to the CPU 211. The bus control unit 216 controls which circuit unit may use the internal bus.

The I2C unit 217 is connected to communication lines via ports 231 and 232 to perform two-line serial communication. The serial communications unit 218 is connected to a communication line (not shown) to perform one-line serial communication.

The timer unit 219 counts a system clock, and the count value of the timer unit 219 is referenced by the CPU 211. The power-on reset unit 220 detects the rise of power supply Vdd that is supplied to port 235, generates a reset signal, and supplies the generated reset signal to relevant units of the fuel gauge 200.

The register 221 receives trimming information transferred from the EEPROM 214. The test terminal status setting circuit 222 establishes connection between test ports 237, 238, and the test control circuit 223 according to information stored in the register 221. Also, the test terminal status setting circuit 222 sets the input for the test control circuit 223 connected to the test ports 237 and 238 to a predetermined level.

Upon receiving inputs from the test ports 237 and 238, the test control circuit 223 may change the status of its internal circuit according to the input from the test ports 237 and 238 to enable testing of the internal circuit of the fuel gauge IC 200.

The analog unit 250 includes an oscillator circuit 251, a crystal oscillator circuit 252, a selection control circuit 253, a divider 254, a voltage sensor 255, a temperature sensor 256, a current sensor 257, a multiplexer 258, and a sigma/delta modulator 259.

It is noted that the oscillator circuit 251 may correspond to the first oscillator circuit 112 of FIG. 1, the crystal oscillator circuit 252 may correspond to the second oscillator circuit 113 of FIG. 1, the selection control circuit 253 may correspond to the selection control circuit 114 of FIG. 1, and the current sensor 257, the multiplexer 258, and the sigma/delta modulator 259 may correspond to the detection circuit 136 of FIG. 1.

The oscillation circuit 251 includes a PLL and outputs an oscillation signal of several MHz. The crystal oscillator circuit 252 has an external oscillating element connected to ports 271 and 272 to generate oscillation, and outputs an oscillation signal of several MHz. It is noted that the oscillation frequency of the crystal oscillator circuit 252 may be more accurate than that of the oscillator circuit 251.

The selection control circuit 253 selects either an oscillation frequency signal output by the oscillator circuit 251 or an oscillation frequency signal output by the crystal oscillator circuit 252 based on a selection signal supplied from port 273, supplies the selected oscillation frequency signal to relevant units of the fuel gauge IC 200 as a system lock signal, and also supplies the selected oscillation frequency signal to the divider 254. Additionally, the selection control circuit 253 generates a reset signal RST and a control signal CNT. It is noted that when the selection control circuit 253 does not receive a selection signal from the port 273, it may select the oscillation frequency signal output by the oscillator circuit 251, for example. The divider 254 divides the system clock to generate various types of clocks and supplies the generated clocks to relevant units of the fuel gauge IC 200.

The voltage sensor 255 detects the voltage of batteries (lithium ion batteries) 301 and 302 that are externally connected to ports 274 and 275, respectively, and supplies the analog detected voltage to the multiplexer 258. The temperature sensor 256 detects the environmental temperature of the fuel gauge IC 200 and supplies the analog detected temperature to the multiplexer 258.

Two ends of a current detection resistor 303 are connected to ports 276 and 277, and the current sensor 257 detects the current flowing through the resistor 303 based on the difference in potential of the ports 276 and 277, and supplies the analog detected current to the multiplexer 258.

The multiplexer 258 successively selects and supplies the analog detected voltage, the analog detected temperature, and the analog detected current to the sigma/delta modulator 259. The sigma/delta modulator 259 performs sigma/delta conversion on the detected values and supplies pulse density modulation signals to the CPU 211 via the internal bus so that digital filtering processes for digitalizing the detected voltage, detected temperature, and detected current may be performed by the CPU 211. The CPU 211 integrates the battery charge/discharge currents to calculate the remaining battery power. In one embodiment, the detected temperature may be used for temperature correction.

The fuel gauge IC 200 as is described above is accommodated inside a box 310 along with the batteries 301, 302, the current detection resistor 303, a regulator/protection circuit 304, a resistor 305, and a switch 306 to form the battery pack 300. A terminal 311 of the battery pack 300 is connected to a positive electrode of the battery 301 and a power supply input terminal of the regulator/protection circuit 304, and a power supply output terminal of the regulator/protection circuit 304 is connected to a port 235 of the power supply Vdd of the fuel gauge IC 200. The battery pack 300 also has a terminal 312 that is connected to a connection terminal of the regulator/protection circuit 304 via the resistor 305 and connected to the connection point of the current detection resistor 303 to the port 277 via the switch 306. The regulator/protection circuit 304 stabilizes the voltage between the terminals 311 and 312, and shuts down the switch 306 when this voltage falls outside a predetermined range.

The connection point of the current detection resistor to the port 276 is connected to the port 236 of the power supply Vss of the fuel gauge IC 200. Terminals 313 and 314 of the battery pack 300 are connected to ports 231 and 232 of the fuel gauge IC 200.

Figure 6:
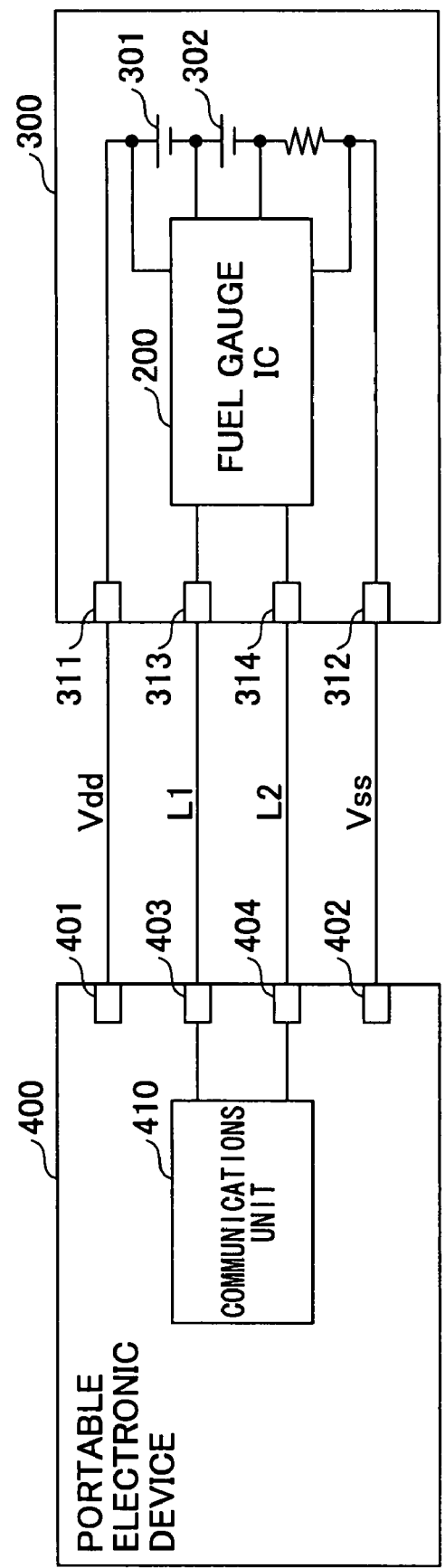
FIG. 6 is a circuit diagram of a portable electronic device using the battery pack shown in FIG. 5.
Figure 7:
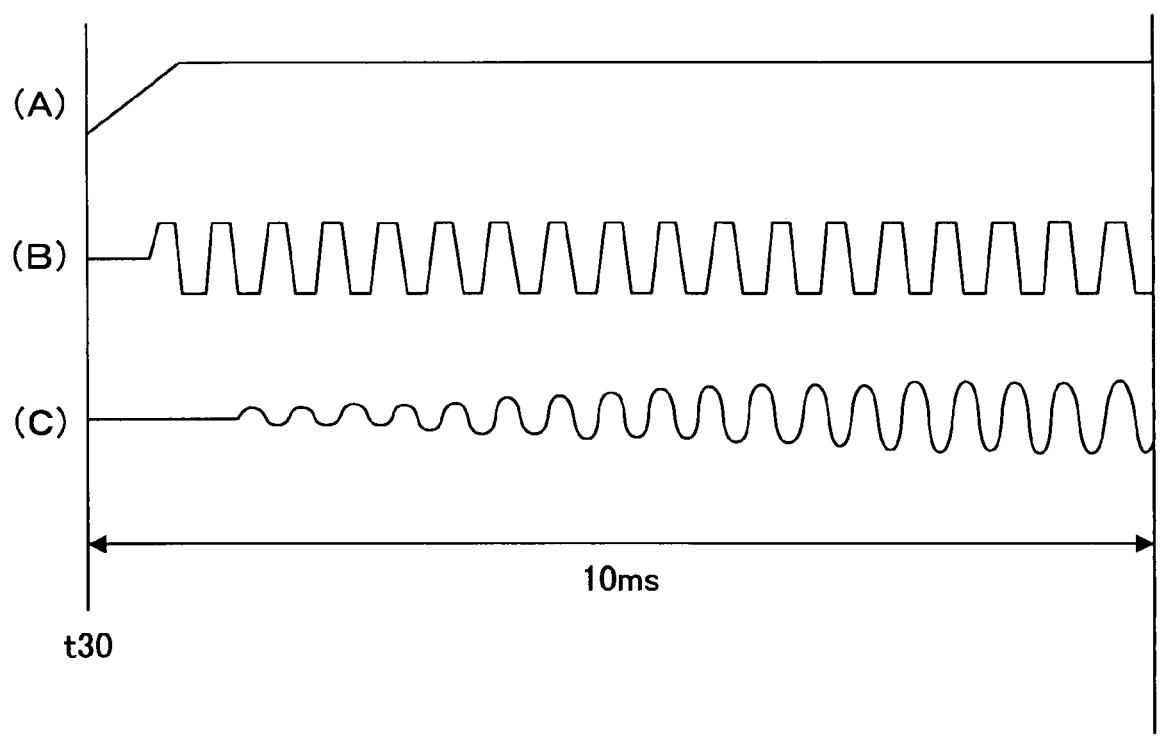
FIG. 7 is a diagram illustrating oscillation signals output by an internal oscillator circuit and a crystal oscillator circuit.

FIG. 6 is a circuit diagram illustrating a portable device using the battery pack 300 shown in FIG. 5. The illustrated portable electronic device 400 may be a main circuit of a portable PC, a digital still camera, or a mobile phone, for example. In one embodiment, the portable electronic device 400 may include an I2C unit that is substantially identical to the I2C unit 217 of FIG. 5 and a CPU.

The terminals 311-314 of the battery pack 300 are connected to terminals 401 and 402 of power supply Vdd and Vss of the portable electronic device 400 and terminals 403 and 404 connected to clock line L1 and data line L2, respectively. In this way, power from the batteries 301 and 302 of the battery pack 300 may be supplied to the portable electronic device 400.

In one embodiment, the portable electronic device 400 may operate as a master and the fuel gauge IC 200 may operate as a slave, and the fuel gauge IC 200 may transmit information on the calculated remaining battery power to a communications unit 410 of the portable electronic device 400 in response to a request issued from the portable electronic device 400.

Further, it is noted that the present invention is not limited to the specific embodiments described above, and variations and modifications may be made without departing from the scope of the present invention.

The present application is based on and claims the benefit of the earlier filing dates of Japanese Patent Application No. 2006-035592 filed on Feb. 13, 2006, and Japanese Patent Application No. 2007-011479 filed on Jan. 22, 2007, the entire contents of which are hereby incorporated by reference.

What is claimed is:

1. A semiconductor integrated circuit device connectable to a battery, comprising:
a signal processing unit including a nonvolatile memory storing circuit setting information and a current detection circuit having circuit parameters;
a plurality of oscillation sources outputting a plurality of oscillation signals; and
a selection control unit configured to select one of the oscillation signals output from the oscillation sources according to a selection signal, and to control a transfer timing for transferring the circuit setting information from the nonvolatile memory to the current detection circuit and an operations start timing for starting signal processing operations of the signal processing unit according to the selected oscillation signal,
wherein the current detection circuit is configured to detect a charge current to or a discharge current from the battery and to adjust the circuit parameters based on the circuit setting information.

2. The semiconductor integrated circuit device as claimed in claim 1, further comprising:
a power-on reset unit that detects a power-on status and resets the signal processing unit;
wherein the selection control unit determines the transfer timing and the operations start timing based on reset operations of the power-on reset unit.

3. The semiconductor integrated circuit device as claimed in claim 2, wherein
the oscillation sources include a first oscillation output unit that is integrated into a semiconductor integrated circuit and a second oscillation output unit that uses an external crystal oscillating element.

4. The semiconductor integrated circuit device as claimed in claim 3, wherein
the selection control unit includes
a selection unit that selects one of a first oscillation signal output by the first oscillation output unit or a second oscillation signal output by the second oscillation output unit according to the selection signal;
a first counter that inputs said one of the first oscillation signal or the second oscillation signal selected by the selection unit and counts to a first time period that is required for transferring the circuit setting information;
a second counter that inputs said one of the first oscillation signal or the second oscillation signal selected by the selection unit and counts to a second time period that is required for stabilizing the second oscillation signal; and
a third counter that inputs said one of the first oscillation signal or the second oscillation signal selected by the selection unit and counts to a third time that is obtained by subtracting the first time period from the second time period; wherein
when the first oscillation signal is selected, the selection control unit controls the transferring of the circuit setting information to start when the power-on reset unit resets the signal processing unit, and controls the signal processing operations of the signal processing unit to start after the first time period elapses from the transfer start timing; and
when the second oscillation signal is selected, the selection control unit controls the transferring of the circuit setting information to start after the third time period elapses from the time the power-on reset unit resets the signal processing unit, and controls the signal processing operations of the signal processing unit to start after the second time period elapses from the time the power-on reset unit resets the signal processing unit.

5. The semiconductor integrated circuit device as claimed in claim 1, wherein the selection signal is supplied from an external source.

6. The semiconductor integrated circuit device as claimed in claim 1, wherein the signal processing unit includes a register that stores the selection signal.

7. A battery pack, comprising:
a battery; and
a semiconductor integrated circuit device coupled to the battery,
said semiconductor integrated circuit device comprising:
a signal processing unit including a nonvolatile memory storing circuit setting information and a current detection circuit having circuit parameters;

a plurality of oscillation sources outputting a plurality of oscillation signals; and a selection control unit configured to select one of the oscillation signals output from the oscillation sources according to a selection signal, and to control a transfer timing for transferring the circuit setting information from the nonvolatile memory to the current detection circuit and an operations start timing for starting signal processing operations of the signal processing unit according to the selected oscillation signal, wherein the current detection circuit is configured to detect a charge current to or a discharge current from the battery and to adjust the circuit parameters based on the circuit setting information.

* * * * *